(12) United States Patent
Malik

(10) Patent No.: US 8,230,475 B2
(45) Date of Patent: Jul. 24, 2012

(54) METHODS AND COMPUTER PROGRAM PRODUCTS FOR SUBCONTENT TAGGING AND PLAYBACK

(75) Inventor: Dale Malik, Atlanta, GA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 895 days.

(21) Appl. No.: 11/941,118

(22) Filed: Nov. 16, 2007

(65) Prior Publication Data
US 2009/0133094 A1 May 21, 2009

(51) Int. Cl.
*H04N 7/173* (2011.01)
(52) U.S. Cl. ............... 725/116; 725/93; 709/219
(58) Field of Classification Search ......... 725/37–61, 725/36, 91–93, 114–116, 134, 142; 709/217–231
See application file for complete search history.

(56) References Cited

U.S. PATENT DOCUMENTS

| | | | |
|---|---|---|---|
| 5,821,945 A * | 10/1998 | Yeo et al. | 345/440 |
| 6,006,241 A * | 12/1999 | Purnaveja et al. | 715/205 |
| 6,026,389 A * | 2/2000 | Nakajima et al. | 1/1 |
| 6,219,837 B1 * | 4/2001 | Yeo et al. | 725/38 |
| 6,637,032 B1 * | 10/2003 | Feinleib | 725/110 |
| 6,711,741 B2 * | 3/2004 | Yeo | 725/87 |
| 6,816,904 B1 * | 11/2004 | Ludwig et al. | 709/226 |
| 6,829,781 B1 * | 12/2004 | Bhagavath et al. | 725/94 |
| 6,868,440 B1 * | 3/2005 | Gupta et al. | 709/219 |
| 7,069,571 B1 * | 6/2006 | Del Sesto et al. | 725/14 |
| 7,076,535 B2 * | 7/2006 | Gupta et al. | 709/219 |
| 7,127,735 B1 * | 10/2006 | Lee et al. | 725/87 |
| 7,263,711 B1 * | 8/2007 | Estipona | 725/112 |
| 7,313,808 B1 * | 12/2007 | Gupta et al. | 725/89 |
| 7,584,491 B2 * | 9/2009 | Bruckner et al. | 725/36 |
| 7,694,320 B1 * | 4/2010 | Yeo et al. | 725/41 |
| 2008/0059997 A1 * | 3/2008 | Plotnick et al. | 725/32 |

* cited by examiner

*Primary Examiner* — Annan Shang
(74) *Attorney, Agent, or Firm* — Cantor Colburn LLP

(57) ABSTRACT

A content provider inserts at least one begin tag and at least one end tag into a broadcast program. The at least one begin tag and at least one end tag defines a video clip segment for the broadcast program. The content provider transmits the broadcast program including the at least one begin tag and the at least one end tag over a network to a digital video recorder (DVR). Upon the broadcast program ending, the content provider transmits a wrapper over the network to the DVR. The wrapper includes wrapper information comprising at least one of a sponsor advertisement, a trailer broadcast, a header broadcast, or a summary of one or more video clip segments.

19 Claims, 2 Drawing Sheets

METHODS AND COMPUTER PROGRAM PRODUCTS FOR SUBCONTENT TAGGING AND PLAYBACK

TECHNICAL FIELD

Exemplary embodiments relate generally to electronic content distribution and, more specifically, to methods and computer program products for subcontent tagging and playback.

BACKGROUND

In today's busy and harried society, program viewers may not have sufficient time or inclination to view a broadcast program in its entirety. For example, a viewer desires to watch the weather portion of a local newscast, but has no interest in sports or national news. Similarly, a viewer may be interested in watching a contestant of special interest on a reality-based program involving a talent competition, but does not wish to spend the time viewing numerous other competitors. Moreover, a typical cable television or internet protocol television (IPTV) system may offer a multiplicity of real time broadcast channels such as CBS, NBC, ABC, PBS and FOX, as well as a number of channels offering movies or other programming on request. Viewers may wish to switch back and forth between two or more programs of interest being broadcast on two or more different channels. Although present-day digital video recorders are typically equipped with rewind and fast-forward functionality, it may be inconvenient and cumbersome to locate one or more desired portions of a program while excluding undesired portions.

SUMMARY

Exemplary embodiments relate to methods and computer program products for subcontent tagging and playback. According to methods of subcontent tagging, a content provider inserts at least one begin tag and at least one end tag into a broadcast program. The at least one begin tag and at least one end tag defines a video clip segment for the broadcast program. The content provider transmits the broadcast program including the at least one begin tag and the at least one end tag over a network to a digital video recorder (DVR). Upon the broadcast program ending, the content provider transmits a wrapper over the network to the DVR. The wrapper includes wrapper information comprising at least one of a sponsor advertisement, a trailer broadcast, a header broadcast, or a summary of one or more video clip segments.

According to methods of subcontent playback, a digital video recorder receives a broadcast program including at least one begin tag and at least one end tag, the at least one begin tag and at least one end tag defining a video clip segment for the broadcast program. The DVR stores the video clip segment for the broadcast program. The DVR associates the stored video clip segment with a thumbnail comprising a first video frame from the video clip segment. Upon the broadcast program ending, the DVR receives a wrapper including wrapper information comprising at least one of a sponsor advertisement, a trailer broadcast, a header broadcast, or a summary of one or more video clip segments. The DVR initiates a display of the thumbnail for the video clip segment. In response to the DVR receiving a user's selection of the thumbnail, the DVR initiates playback of the video clip segment including the wrapper information.

Another set of exemplary embodiments includes computer program products for subcontent tagging. The computer program products include a storage medium readable by a processing circuit and storing instructions for execution by the processing circuit for facilitating a method. The method includes a content provider inserting at least one begin tag and at least one end tag into a broadcast program. The at least one begin tag and at least one end tag defines a video clip segment for the broadcast program. The content provider transmits the broadcast program including the at least one begin tag and the at least one end tag over a network to a digital video recorder (DVR). Upon the broadcast program ending, the content provider transmits a wrapper over the network to the DVR. The wrapper includes wrapper information comprising at least one of a sponsor advertisement, a trailer broadcast, a header broadcast, or a summary of one or more video clip segments.

Another set of exemplary embodiments includes computer program products for subcontent playback. The computer program products include a storage medium readable by a processing circuit and storing instructions for execution by the processing circuit for facilitating a method. The method includes a digital video recorder receiving a broadcast program that includes at least one begin tag and at least one end tag, the at least one begin tag and at least one end tag defining a video clip segment for the broadcast program. The DVR stores the video clip segment for the broadcast program. The DVR associates the stored video clip segment with a thumbnail comprising a first video frame from the video clip segment. Upon the broadcast program ending, the DVR receives a wrapper including wrapper information comprising at least one of a sponsor advertisement, a trailer broadcast, a header broadcast, or a summary of one or more video clip segments. The DVR initiates a display of the thumbnail for the video clip segment. In response to the DVR receiving a user's selection of the thumbnail, the DVR initiates playback of the video clip segment including the wrapper information.

Other methods, computer program products, and apparatuses according to embodiments will be or become apparent to one with skill in the art upon review of the following drawings and detailed description. It is intended that all such additional systems, methods, and/or computer program products be included within this description, be within the scope of the exemplary embodiments, and be protected by the accompanying claims.

BRIEF DESCRIPTION OF THE DRAWINGS

Referring now to the drawings wherein like elements are numbered alike in the several FIGURES.

The detailed description explains the exemplary embodiments, together with advantages and features, by way of example with reference to the drawings.

DETAILED DESCRIPTION

In the following detailed description, numerous specific details are set forth in order to provide a thorough understanding of embodiments. However it will be understood by those of ordinary skill in the art that the embodiments may be practiced without these specific details. In other instances, well-known methods, procedures, components and circuits have not been described in detail so as not to obscure the embodiments.

Figure 1:
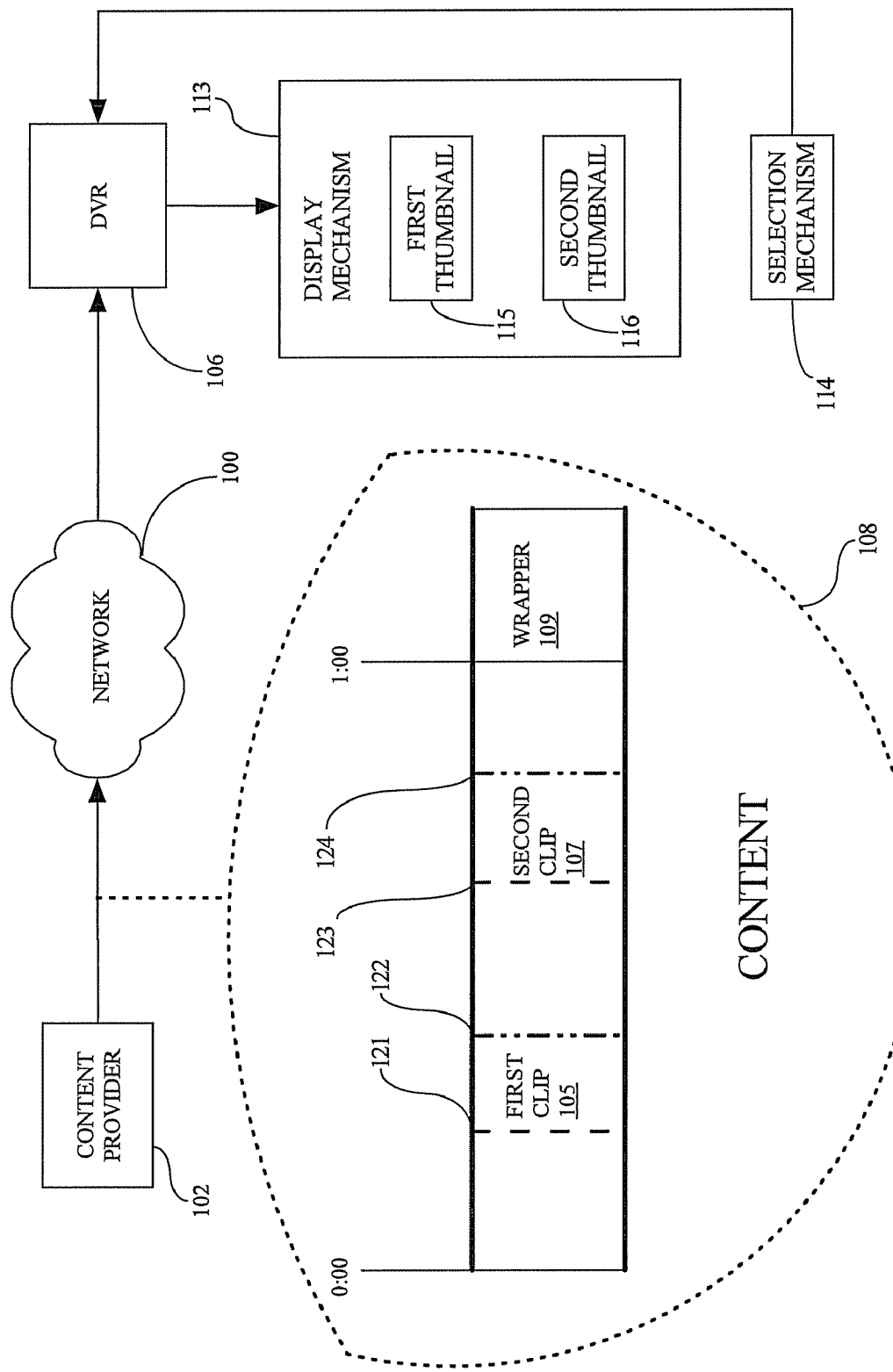
FIG. 1 is a simplified block diagram of an exemplary communication system used to perform subcontent tagging and playback.

FIG. 1 is a simplified block diagram of an exemplary communication system used to perform subcontent tagging and playback. A content provider 102 provides programming that includes one or more live broadcast programs and, optionally, one or more prerecorded programs. The content provider 102 is illustratively implemented using a head end for receiving and processing a plurality of broadcast channels such as CBS, NBC, ABC, FOX, and ESPN to provide program streams for each of the plurality of broadcast channels. The content provider 102 is operatively coupled to a network 100. Illustratively, the content provider 102 may, but need not, include one or more access servers and one or more delivery servers.

A non-exhaustive list of examples for the network 100 includes wired or optical networks such as the Internet, intranets, Ethernet networks, token rings, Universal Serial Bus (USB), wired networks according to the IEEE 1394-1995, IEEE 1394a-2000, and IEEE 1394b standards (commonly known as "FireWire"), or any combination thereof. The network 100 may include any combination of additional communication devices (not shown) such as gateways, routers, switches, and the like. Additionally or alternatively, the network 100 may include wireless networks such as Direct Sequence-Code Division Multiple Access (DS-CDMA), Global System for Mobile Communications (GSM), North American Digital Cellular (NADC), Time Division Multiple Access (TDMA), Extended-TDMA (E-TDMA), W-CDMA, GPRS, GSM, Enhanced Data for GSM Evolution (EDGE), 3G and 4G communication, wireless local area networks such as 802.11, Bluetooth™, Zigbee™, ultra wideband (UWB), or various combinations thereof.

A digital video recorder (DVR) 106 is operatively coupled to the network 100. The DVR 106 includes a receiving mechanism for receiving one or more broadcast programs from the network 100. According to exemplary embodiments, the DVR 106 also includes a storage mechanism, operatively coupled to the receiving mechanism, that is capable of storing one or more broadcast programs received from the network 100 for subsequent playback on a display mechanism 113. The display mechanism 113 is also capable of displaying a first thumbnail 115 and a second thumbnail 116. In accordance with exemplary embodiments, the first thumbnail 115 represents a first video frame of a first clip 105 and the second thumbnail 116 represents a first video frame of a second clip 107. The first thumbnail 115 and the second thumbnail 116 may, but need not, be similar in appearance to scene change still images commonly present on prerecorded DVD movies. Optionally, the display mechanism 113 is capable of displaying a playlist of one or more thumbnails that have been selected by a user for future playback using a selection mechanism 114.

The selection mechanism 114 may accept user input for selecting a thumbnail such as the first thumbnail 115 or the second thumbnail 116. Illustratively, the selection mechanism 114 may be implemented using a keypad, keyboard, touch-sensitive display screen or remote control. The selection mechanism 114 could, but need not, be integrated into the DVR 106 or into the display mechanism 113 or both. Optionally, the selection mechanism 114 permits a user to switch back and forth between viewing a clip, such as the first clip 105, and viewing an entire broadcast program from which the clip was obtained.

As illustrated in FIG. 1, the content provider 102 transmits a content 108 to the network 100. According to exemplary embodiments, the content 108 includes a broadcast program commencing at 0:00 and ending at 1:00. A first begin tag 121 and a first end tag 122 define a beginning time and an ending time for the first clip 105. Similarly, a second begin tag 123 and a second end tag 124 define a beginning time and an ending time for the second clip 107. Illustratively, the first begin tag 121, the first end tag 122, the second begin tag 123, and the second end tag 124 are each implemented using extensible markup language (XML) tags with time stamps. For example, a first time stamp defines a beginning time for the first clip 105, and a second time stamp defines an ending time for the first clip 105. Illustratively, the first clip 105 and the second clip 107 may be emailed to one or more destination addresses over the network 100 by an email-enabled DVR, such as the DVR 106, or by a computing device used in conjunction with the DVR 106.

According to exemplary embodiments, XML tags are editable and also permit entry of commentary associated with the first clip 105 or the second clip 107 or both. XML tags may, but need not, be used to provide a pop-up message or advertisement in the first clip 105 or the second clip 106, or both. Likewise, XML tags may be used to blank out a certain number of lines of program material at the top or bottom of a screen displayed by the display mechanism 113, so as to permit textual or graphical information to be inserted into the blanked out lines. XML tags can be used to provide a message or advertisement that persists on the screen of the display mechanism 113 for a certain amount of time, such as five seconds.

According to exemplary embodiments, the content 108 includes a wrapper 109 after the end of the broadcast program. The wrapper 109 includes wrapper information comprising at least one of a sponsor advertisement, a trailer broadcast, a header broadcast, or a summary of one or more video clip segments such as the first clip 105 or the second clip 107.

Figure 2:
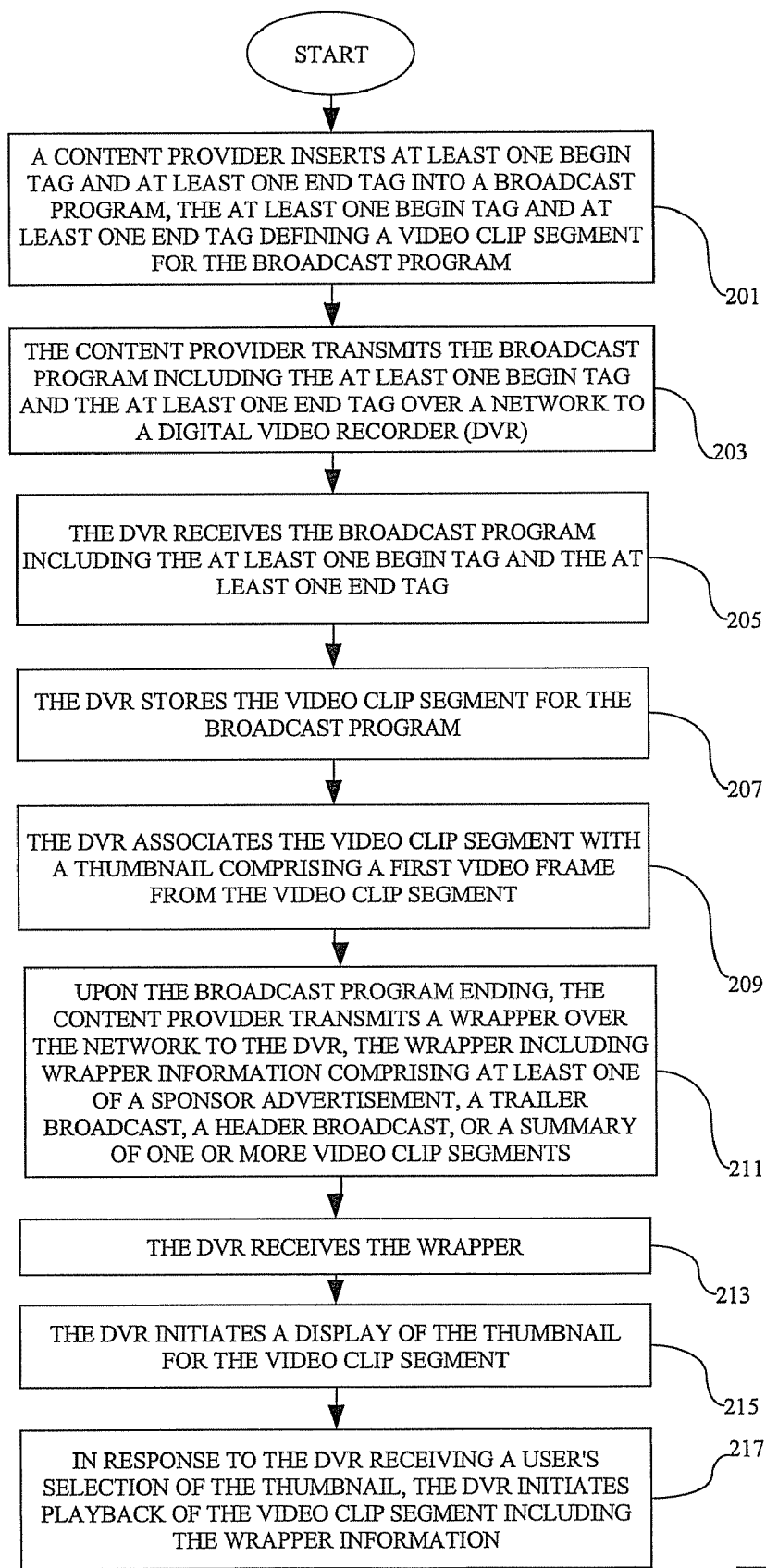
FIG. 2 is a flowchart of an exemplary procedure for performing subcontent tagging and playback.

FIG. 2 is a flowchart of an exemplary procedure for performing subcontent tagging and playback. The procedure commences at block 201 where a content provider (such as the content provider 102 of FIG. 1) inserts at least one begin tag 121 (FIG. 1) and at least one end tag 122 into a broadcast program. The at least one begin tag 121 and at least one end tag 122 defines a video clip segment for the broadcast program, such as first clip 105. Next, at block 203 (FIG. 2), the content provider 102 transmits the broadcast program including the at least one begin tag 121 and the at least one end tag 122 over a network (such as the network 100, FIG. 1) to a digital video recorder (DVR 106, FIG. 1).

The procedure advances to block 205 (FIG. 2) where the DVR 106 (FIG. 1) receives the broadcast program including the at least one begin tag 121 and the at least one end tag 122. The DVR 106 then stores the video clip segment for the broadcast program (FIG. 2, block 207). The DVR 106 associates the video clip segment with a thumbnail comprising a first video frame from the video clip segment (block 209). For example, the DVR 106 may associate a video clip segment comprising the first clip 105 (FIG. 1) with the first thumbnail 115, wherein the first thumbnail 115 comprises a first video frame of the first clip 105. Similarly, the DVR may associate a video clip segment comprising the second clip 107 with the second thumbnail 116, wherein the second thumbnail 116 comprises a first video frame of the second clip 107.

At block 211 (FIG. 2), upon the broadcast program ending, the content provider 102 (FIG. 1) transmits a wrapper, such as the wrapper 109, over the network 100 to the DVR 106. According to exemplary embodiments, the wrapper 109 includes wrapper information comprising at least one of a sponsor advertisement, a trailer broadcast, a header broadcast, or a summary of one or more video clip segments. Next, at block 213 (FIG. 2), the DVR 106 (FIG. 1) receives the wrapper 109. The DVR 106 initiates a display of the thumbnail for the video clip segment (block 215, FIG. 2). For example, the DVR 106 (FIG. 1) may initiate a display of the first thumbnail 115 for the first clip 105 and the second thumbnail 116 for the second clip 107 on the display mechanism 113.

The procedure of FIG. 2 advances to block 217 where, in response to the DVR 106 (FIG. 1) receiving a user's selection of a thumbnail such as the first thumbnail 115 or the second thumbnail 116 over the selection mechanism 114, the DVR 106 initiates playback of a video clip segment corresponding to the selected thumbnail and playback of at least a portion of the wrapper 109. For example, if the user selects the first thumbnail 115, the DVR 106 initiates playback of first clip 105 and also plays back at least one of a sponsor advertisement, a trailer broadcast, a header broadcast, or a summary of one or more video clip segments included in the wrapper 109. A header broadcast may include program material inserted prior to a video clip segment, such as first clip 105, whereas a trailer broadcast may include program material inserted after a video clip segment.

As described above, the exemplary embodiments can be in the form of computer-implemented processes and apparatuses for practicing those processes. The exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the exemplary embodiments. The exemplary embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an apparatus for practicing the exemplary embodiments. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for tagging subcontent, the method including:
   inserting a first begin tag and a first end tag into a broadcast program, wherein the first begin tag and first end tag define a first video clip segment of the broadcast program, a video frame of the first video clip segment being displayable as a first thumbnail;
   inserting a second begin tag and a second end tag into the broadcast program, wherein the second begin tag and second end tag define a second video clip segment of the broadcast program, a video frame of the second video clip segment being displayable as a second thumbnail, wherein the first begin tag is distinct from the second begin tag, the first end tag is distinct from the second end tag and the first video clip segment is distinct from the second video clip segment; and
   transmitting the entire broadcast program including the first begin tag, the first end tag, second begin tag and the second end tag, over a network to a digital video recorder.

2. The method of claim 1 further comprising:
   upon the broadcast program ending, transmitting a wrapper over the network to the digital video recorder;
   wherein the wrapper includes wrapper information comprising a sponsor advertisement.

3. The method of claim 1 wherein the first begin tag and the first end tag are each implemented using extensible markup language tags with time stamps wherein a first time stamp defines a beginning time for the first video clip segment, and a second time stamp defines an ending time for the first video clip segment.

4. The method of claim 3 further including emailing the first video clip segment to a destination address over the network.

5. The method of claim 3 wherein the extensible markup language tags are editable and used to perform entry of commentary associated with the first video clip segment.

6. A computer program product for tagging subcontent, the computer program product including a storage medium readable by a processing circuit and storing instructions for execution by the processing circuit for facilitating a method comprising:
   inserting a first begin tag and a first end tag into a broadcast program, wherein the first begin tag and first end tag define a first video clip segment of the broadcast program, a video frame of the first video clip segment being displayable as a first thumbnail;
   inserting a second begin tag and a second end tag into the broadcast program, wherein the second begin tag and second end tag define a second video clip segment of the broadcast program, a video frame of the second video clip segment being displayable as a second thumbnail, wherein the first begin tag is distinct from the second begin tag, the first end tag is distinct from the second end tag and the first video clip segment is distinct from the second video clip segment; and
   transmitting the entire broadcast program including the first begin tag, the first end tag, second begin tag and the second end tag, over a network to a digital video recorder.

7. The computer program product of claim 6 further comprising instructions for:
   upon the broadcast program ending, transmitting a wrapper over the network to the digital video recorder;
   wherein the wrapper includes wrapper information comprising a sponsor advertisement.

8. The computer program product of claim 6 wherein the first begin tag and the first end tag are each implemented using extensible markup language tags with time stamps wherein a first time stamp defines a beginning time for the first video clip segment, and a second time stamp defines an ending time for the first video clip segment.

9. The computer program product of claim 8 further including emailing the first video clip segment to a destination address over the network.

10. The computer program product of claim 8 wherein the extensible markup language tags are editable and used to perform entry of commentary associated with the first video clip segment.

11. A method of subcontent playback, the method including receiving at a digital video recorder an entire broadcast program including a first begin tag and first end tag, the first begin tag and first end tag defining a first video clip segment of the broadcast program;

the broadcast program further including a second begin tag and second end tag, the second begin tag and second end tag defining a second video clip segment of the broadcast program, wherein the first begin tag is distinct from the second begin tag, the first end tag is distinct from the second end to and the first video clip segment is distinct from the second video clip segment;

storing at the digital video recorder the broadcast program;

the digital video recorder associating the first video clip segment with a first thumbnail comprising a video frame from the first video clip segment and associating the second video clip segment with a second thumbnail comprising a video frame from the second video clip segment; and the digital video recorder providing the first thumbnail and the second thumbnail for display on a display device to enable selection of the first video clip segment and the second video clip segment for display.

12. The method of claim 11 further comprising:

upon the broadcast program ending, receiving a wrapper over the network to the digital video recorder;

wherein the wrapper information comprises a sponsor advertisement.

13. The method of claim 11 wherein, in response to receiving a user's selection of the first thumbnail, initiating playback of the first video clip segment.

14. The method of claim 11 wherein the first begin tag and the first end tag are each implemented using extensible markup language tags with time stamps wherein a first time stamp defines a beginning time for the first video clip segment, and a second time stamp defines an ending time for the first video clip segment.

15. The method of claim 14 wherein the extensible markup language tags are editable and used to perform entry of commentary associated with the video clip segment.

16. The method of claim 11 further including emailing the first video clip segment to a destination address over the network.

17. A computer program product for subcontent playback, the computer program product including a storage medium readable by a processing circuit and storing instructions for execution by the processing circuit for facilitating a method comprising:

receiving at a digital video recorder an entire broadcast program including a first begin tag and first end tag, the first begin tag and first end tag defining a first video clip segment of the broadcast program;

the broadcast program further including a second begin tag and second end tag, the second begin tag and second end tag defining a second video clip segment of the broadcast program, wherein the first begin tag is distinct from the second begin tag, the first end tag is distinct from the second end tag and the first video clip segment is distinct from the second video clip segment;

storing at the digital video recorder the broadcast program;

the digital video recorder associating the first video clip segment with a first thumbnail comprising a video frame from the first video clip segment and associating the second video clip segment with a second thumbnail comprising a video frame from the second video clip segment; and the digital video recorder providing the first thumbnail and the second thumbnail for display on a display device to enable selection of the first video clip segment and the second video clip segment for display.

18. The computer program product of claim 17 further comprising instructions for:

upon the broadcast program ending, receiving a wrapper over the network to the digital video recorder;

wherein the wrapper information comprises a sponsor advertisement.

19. The computer program product of claim 17 further comprising instructions for initiating playback of the first video clip segment in response to receiving a user's selection of the first thumbnail.

\* \* \* \* \*